United States Patent [19]

Ono

[11] 4,187,639
[45] Feb. 12, 1980

[54] MOLDING PROCESS FOR A NATURAL FRUIT OF A FRUIT-TREE OR VEGETABLE, A MOLDING FRAME THEREFOR AND MOLDED ABOVE FRUIT

[76] Inventor: Tomoyuki Ono, No. 31, Tsukasa Mansion, 1-chome, Minato-ku, Tokyo, Japan

[21] Appl. No.: 878,909

[22] Filed: Feb. 17, 1978

[30] Foreign Application Priority Data

Mar. 3, 1977 [JP] Japan .................... 52-022193

[51] Int. Cl.² ................................ A01G 1/00
[52] U.S. Cl. ........................... 47/58; 47/26; 220/4 E; 220/DIG. 27
[58] Field of Search .............. 47/26, 31, 58, 28; 220/4 E

[56] References Cited

U.S. PATENT DOCUMENTS 1,544,322  6/1925  Kellermann .................... 47/31
2,096,507 10/1937  Czeszcziczki ............... 47/58 UX

*Primary Examiner*—Robert E. Bagwill

[57] ABSTRACT

A molding process for a natural fruit of a fruit-tree or vegetable, a molding frame therefor and a molded fruit of a fruit-tree or vegetable which is produced by the above molding process and with the above molding frame are disclosed. Taste of the molded fruit is no less than that of a natural fruit. Various artificial shapes are applied to a fruit by the above molding process and frame.

3 Claims, 3 Drawing Figures

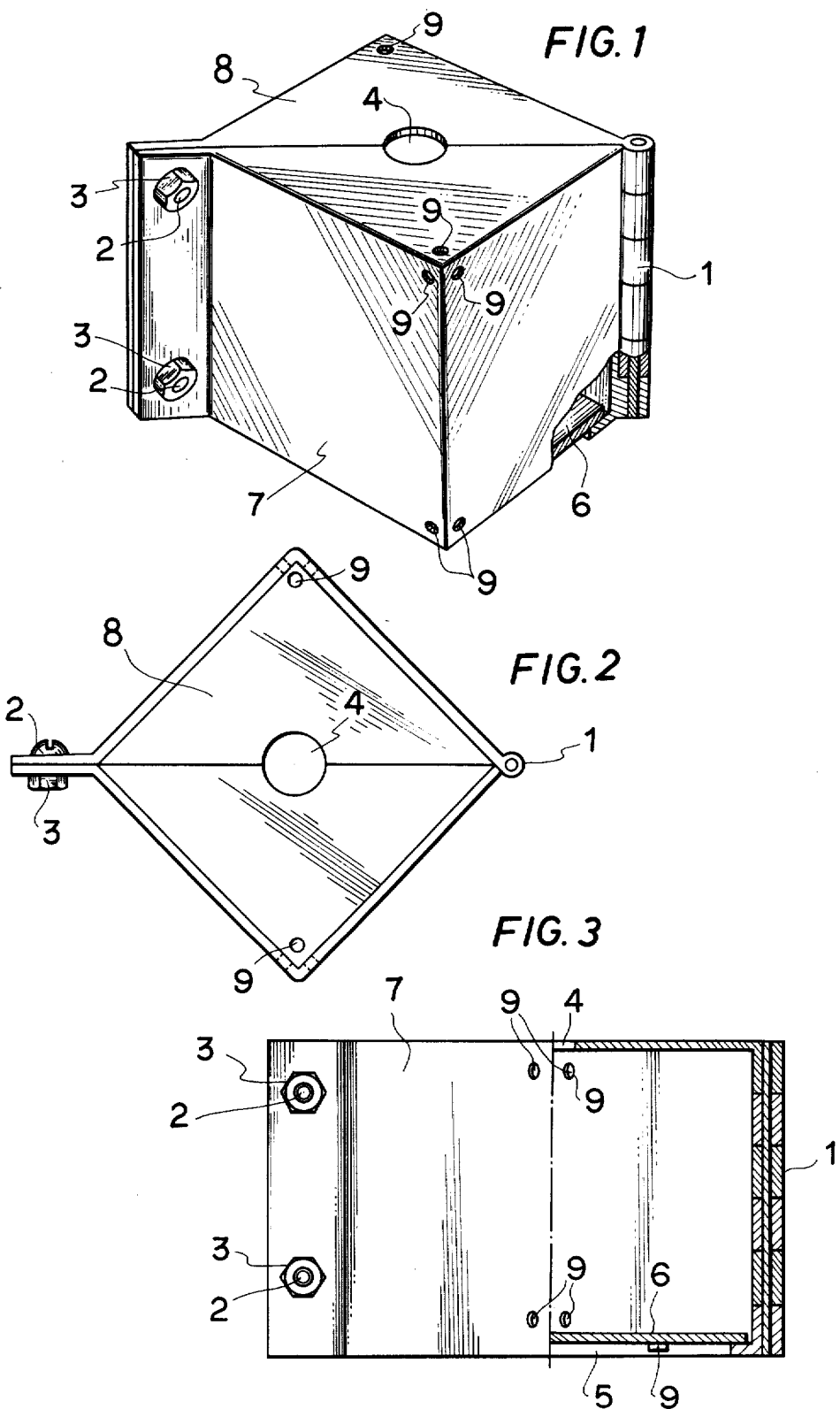

4,187,639

MOLDING PROCESS FOR A NATURAL FRUIT OF A FRUIT-TREE OR VEGETABLE, A MOLDING FRAME THEREFOR AND MOLDED ABOVE FRUIT

BACKGROUND OF THE INVENTION

This invention relates to a process for molding a natural fruit of a fruit-tree or vegetable, a molding frame therefor and a molded fruit which is produced by the above molding process and frame.

Hereinafter, a term a "natural fruit" includes a rare fruit of a fruit-tree or vegetable which exists in the natural world, a term a "molded fruit" includes a molded fruit of a fruit-tree or vegetable which is produced by molding the above natural fruit and a term a "fruit" includes the above natural fruit and molded fruit. A natural fruit is commonly enlarged with no restriction to be limited to a column or ball shape. It is not able to produce a fruit of a cube or another molding shape.

Accordingly, a natural fruit requires a large space for storage or transportation, and has only a poor design from an aesthetic point of view. In addition, there results a considerably large percentage natural fruits of a lower class and modified fruits below standards having no commercial value.

SUMMARY OF INVENTION

The primary object of the present invention is to provide a molding process for producing a molded fruit in various shapes.

Another object of the present invention is to provide a molding process for producing a molded fruit without injuring the taste of a natural fruit.

Another object of the present invention is to provide a molding process preventing the production of a fruit of a lower class, or modified fruit.

Another object of the present invention is to provide a molding frame for applying various shapes to a natural fruit.

Another object of the present invention is to provide molded fruit secured to a casing thereof.

Another object of the present invention is to provide molded fruit of a large added value by applying various designs.

Another object of the present invention is to provide a molded fruit in a constant standard of size.

Another object of the present invention is to provide a molded fruit which requires lower cost for storage or transportation.

According to the present invention, it is advantageous to produce a molded fruit of various shapes without injuring the taste of a natural fruit. Molded fruit of a large commercial value is obtained owing to the above advantages. The molded fruit according to the present invention requires lower cost for storage or transportation. In addition, a molded fruit secured to the casing molding the fruit is available. The present invention gives many people a large interest in molding because it introduces a design idea in the fields of naturals fruit culture.

BRIEF DESCRIPTION OF DRAWINGS

FIG. 1 is a perspective view of a molding frame;
FIG. 2 is a top view of a molding frame;
FIG. 3 is a front cross sectional view of a molding frame broken away partially.

DESCRIPTION OF THE PREFERRED EMBODIMENT

The preferred embodiment of the present invention is described below in respect of a tomato. FIGS. 1 to 3 illustrate a molding frame of a cube shape, whereby a cube tomato is produced. Generally, a term between which fruits and vegetables come into flower to bear fruits, and then to complete enlargement is called an enlargement term. A molding frame A is mounted around a tomato between one-third to two-thirds of the enlargement term. The molding frame A is constructed of a material having sufficient strength to bear a pressure of an enlargement of a fruit of a tomato plant and does not get rusty due to moisture of fruits and vegetables or soil, or rain. For instance, it is made from strengthened plastic, glass, ceramic, porcelain, stainless steel and the like. The size of the molding frame A varies in conformity with the variety of natural fruit. It is preferable that the inner size of the molding frame A be slightly smaller than that of the outer size of the natural fruit growing with no restriction. On the one hand, the molding frame A of an extremely smaller inner size compared with that of the natural fruit injures the taste of the natural fruit because the molding frame A compresses natural fruit to excess extent. On the other hand, the molding frame A of an extremely larger inner size compared with that of the natural fruit compresses it a little, which results in poor effect of molding. A natural fruit of a tomato plant which completes an enlargement is of about 6–7 cm diameter, so that the inner size of the molding frame A is preferably about 5.5 cm. Stainless steel or FRP is adopted as a material for the molding frame A. An opening and shutting portion of the molding frame A is provided with a hinge or the like 1, and the other portion is secured. A lower portion 5 of the molding frame A opens and is provided with a bottom plate 6 which is removable from the molding frame A. Ventilation in the molding frame A is ensured by means of openings defined by the bottom plate 6 and a side plate 10, and ventilation openings 9 positioned at upper and lower portions in the corner defined by two side plates 10.

The bottom plate 6 may be secured to the lower portion 5 if the ventilation within the molding frame A is ensured by other means. Thus, it is preferable to provide any ventilation opening 9 at upper or lower portions in the corner defined by two side plates 10 in order to grow fruit in the molding frame A, so that the shape of the ventilating opening 9 is not impressed on the surface of the molded fruit. An opening 4 is positioned at the upper portion of the molding frame A. A stalk connected with the fruit within the molding frame is inserted into the opening 4. A bolt and the like 2 and a nut and the like 3 are mounted at the opposite side to that of the hinge 1. The bolt 2 and nut 3 are removed from the molding frame A, and the molding frame A is opened by means of the hinge 1, so that the molded fruit can be taken out. Since the enlargement term of a tomato is about one month, the molding frame A is mounted around a fruit of a tomato plant at any time between about 10 to 20 days after becoming a fruit, and the bolt 2 and nut 3 are loosely mounted. The molding frame A is inwardly compressed by the fruit, so that it must not be outwardly supported. After the molding frame A is mounted around the fruit of a tomato plant, fertilizer urging the fruit to grow large is supplied to roots of the tomato plant, and the other unnecessary fruits are cut off. These operations effect a time of enlargement completion sooner, so that a term in which a fruit is compressed is shortened. Generally it is not preferable to compress a natural fruit, so that it is more preferable that a compressing term of a fruit is shortened. The fruit grows large in conformity with the inner shape of the molding frame A, so that the molded fruit of the desired shape is obtained. At two days before molding is completed, the bolt 2 and nut 3 are entirely secured. Thereby, cube tomatoes in constant standards are obtained.

After an enlargement term ends, the molding frame A is removed from the fruit of the tomato plant. A cube shape of the tomato is not broken because the enlargement term thereof ends although the molding frame A is removed therefrom. A fruit such as a fruit of a tomato plant which requires color is exposed to sunshine to obtain natural color. Molded fruits of a tomato plant may be harvested when the molding frame A is removed.

In the above embodiment, the molding frame A in a cube shape is used, but a molding frame A in a column, star, cylinder heart, man or animal shape may be used.

In addition, the side plate 10 is prepared from an opaque material but all or partial portion of the side plate 10 may be prepared from a transparent material such as acrylic plastic or glass.

In case of the above embodiment, the hinge 1, bolt 2 and nut 3, are used for opening and shutting the molding frame A, but a glass molding frame may be mounted around fruits of a tomato plant with a tape, wire or lace. Further, molded tomatoes secured to the molding frame as a casing may be commercially transported.

The above molding process may be for use in molding other fruits including a melon, particularly a net melon, a water melon, a cucumber, an egg-apple, a pumpkin, a squash or the like. Further, it may be for use in molding natural fruits of fruit-trees, for example, a pear, an apple, a mango, a grape-fruits or the like. An enlargement term of a melon is about 50 to 60 days and a transparent molding frame may be mounted at any time between 16 to 20 days.

An enlargement term of a water melon is about 50 to 60 days, that of a cucumber is about 7 to 10 days, that of an egg-apple is about 20 days, and a molding frame therefor may be mounted between one-half to two thirds of the enlargement term. It is preferable to mold a cross section of a cucumber.

A surface of a net melon is injured after removing a molding frame because a net is not formed on the compressed surface while a net melon grows large in conformity with the shape of the molding frame. Thus the net melon is laid ripe for 2 to 3 days to form a net on the compressed surface of the net melon, and again compressed by the molding frame so that it is harvested about 4 or 5 days later.

What I claim is:

1. A molding process comprising the step of mounting a transparent molding frame about an immature natural net melon whose compressed surface would be injured after removing the molding frame from the net melon after it is molded, said frame being mounted about the net melon before growth of the met melon is completed and having a molding inner shape of an inner size sufficiently large to permit further growth of the net melon therewithin and small enough to shape the resultant fruit, and said method further comprising growing said net melon without said molding frame for a sufficient period to form a net on said compressed surface, and thereafter mounting said molding frame about said net melon for a predetermined period of time, whereby said net melon grows in conformity with the inner shape of said molding frame and results in a completely ripe molded fruit for use as a food.

2. A molding process according to claim 1, wherein fertilizer is applied to the roots of the tree to promote growth of the fruit and to reduce the period of molding.

3. A molding process according to claim 1, wherein said frame has an opening for inserting a stalk connected with said net melon and a ventilating opening within said frame.

* * * * *